(12) United States Patent
Laing

(10) Patent No.: US 6,390,381 B1
(45) Date of Patent: May 21, 2002

(54) CONTROL UNIT AND PROCESS FOR ADJUSTING THE HEATING LOOPS IN LARGE AREA HEATING SYSTEMS AND TO CONTROL THE ADJUSTED HEATING LOOPS

(76) Inventor: Oliver Peter Laing, Klingelbrunnenweg 4, D 71686 Remseck (DE)

( * ) Notice: Subject to any disclaimer, the term of this patent is extended or adjusted under 35 U.S.C. 154(b) by 0 days.

(21) Appl. No.: 09/528,912

(22) Filed: Mar. 20, 2000

(51) Int. Cl.[7] .............................. F24D 3/00; G05D 23/00
(52) U.S. Cl. ..................... 237/8 R; 165/293; 236/91 F; 237/63
(58) Field of Search ......................... 237/63, 8 R, 8 A; 165/219, 293; 62/201; 236/91 F

(56) References Cited

U.S. PATENT DOCUMENTS 4,708,287 A * 11/1987 De Wit ........................ 237/8 R
5,839,655 A * 11/1998 Iritani ........................ 237/8 A

* cited by examiner

*Primary Examiner*—William Wayner

(57) ABSTRACT

A control system for the room temperature in large area heating systems comprises a feed-line manifold and a return-line manifold and for each heating loop an electrically activated throttle valve. A control-unit automatically adjusts the throttle degree of each heating loop so that the temperature difference between the feed-line temperature and the return-line temperature of each heating loop is the same.

7 Claims, 1 Drawing Sheet

CONTROL UNIT AND PROCESS FOR ADJUSTING THE HEATING LOOPS IN LARGE AREA HEATING SYSTEMS AND TO CONTROL THE ADJUSTED HEATING LOOPS

FIELD OF THE INVENTION

The invention refers to large area heating systems with several loops for different rooms, Large area heating systems installed in floors or ceilings, operate with low feed-line temperatures and low temperature difference between the feed-line and the return-line of a loop. Since the heating circuits in the different zones are integrated into the floor, the wall or the ceiling the thermal inertia is high, which makes the control difficult, In addition, due to the different room sizes and different distances between the pipes, the length of the loops in the different zones varies considerably.

BACKGROUND OF THE INVENTION

In order to prevent that a much higher flow rate flows through a short loop due to its lower resistance than through a longer loop, releasing too much heat in the short loop, a manual control valve for each loop is placed at the manifold. These valves adjust either the resistance according to the length of the loop or in case of valves with flow meter to a calculated flow. This adjustment aims at leveling the temperature difference between the loops of different lengths, to assure that the total surface of a room to be heated especially in zones with very long loops— has the desired uniform surface temperature. In many areas, a single room control for each loop in addition to the usual boiler control is mandated by codes. Therefore, in floor- and ceiling heater systems the loop of each room has to be controlled. This requires room thermostats and an on-off valve at the manifold for each loop. As soon as the desired temperature for a room has been reached, the throughput through the loop of this room will be interrupted. The adjustment and the adaptation of each single loop to the special requirements of the room takes a lot of time and an optimal function can never be guaranteed.

SUMMARY OF THE INVENTION

Aim of the invention is to substitute the time consuming manual adjustment (which is often very inaccurate) by an automatic control unit that will maintain a constant temperature difference between the feed-line and the return-line of the loops and consequently an optimal heat distribution in the different zones.

DESCRIPTION OF THE PREFERRED EMBODIMENT OF THE INVENTION

Figure 1:
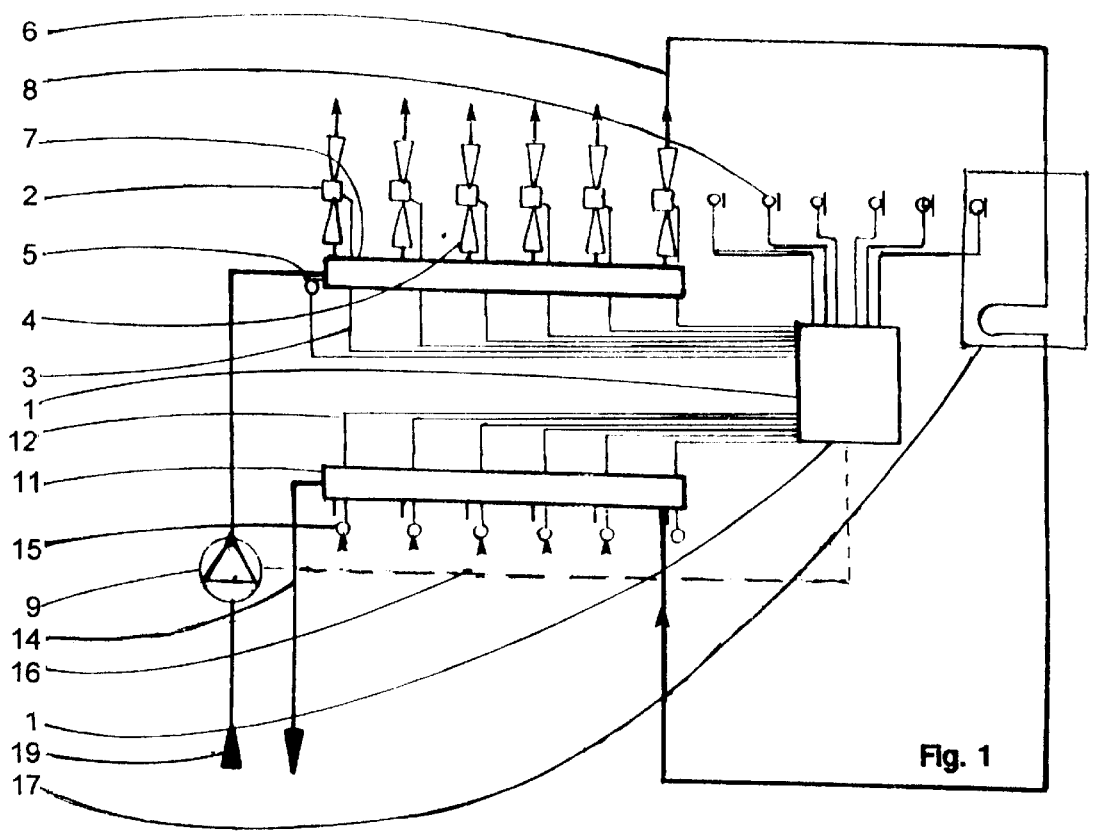
FIG. 1 shows a control unit according to the invention in combination with feed-line and return-line temperature sensors.

According to FIG. 1 the on-off valves on the manifold 7 are replaced by continuously adjustable electrical throttle valves 4. The control unit 1 is electrically connected to a temperature sensor 5 by lead 3 that measures the temperature of the feed-line 19 of the Primary loop and also measures with temperature sensors 15 positioned on the return manifold 11. connected to the control unit 1 by lead 12. the temperature in the return-line of each loop. This control unit 1 adjusts the throttle valves 4 such that the temperature difference between the feed-line 19 and the return-line 14 for each loop remains constant. To achieve this, the control unit 1 measures the temperature difference between the water temperature of the feed-line by temperature sensor 2 and the water temperature of each loop of the return-line by temperature sensor 15, when all loops are open and thereafter adjusts the infinitely adjustable valves 4 accordingly, whereby the longest loop 6 with the lowest return-line temperature stays completely open and all other loops are throttled until their temperature drop equals the temperature drop of the longest loop 6. The control unit 1 can also be connected to the room-thermostats 8 of each loop and doses the respective valve 4 as soon as the preset temperature of room 17 has been reached.

When the pressure of pump 9 is high, there can be disturbing noises caused by turbulence when a part of the loops has been closed, causing an increase of the pump pressure. As a precaution for avoiding these noises in automatically controlled loops, the invention limits the difference of the water pressure between the feed-line and the return-line to a value that does not cause turbulence-noise by control unit 1. connected by lead 18. If the rpm of the circulator pump 9 is adjustable, the control unit 1 will reduce the rpm of the circulator pump as soon as some of the loops have been dosed, so that the water velocity caused by the pump pressure remains below the velocity that causes noise. In installations in which the rpm of the pump cannot be adjusted, the flow through the loops will be reduced by throttling valves 4, until a preset minimum temperature difference between the feed-line and the return-line of a loon of for instance 5K has been reached.

Figure 2:
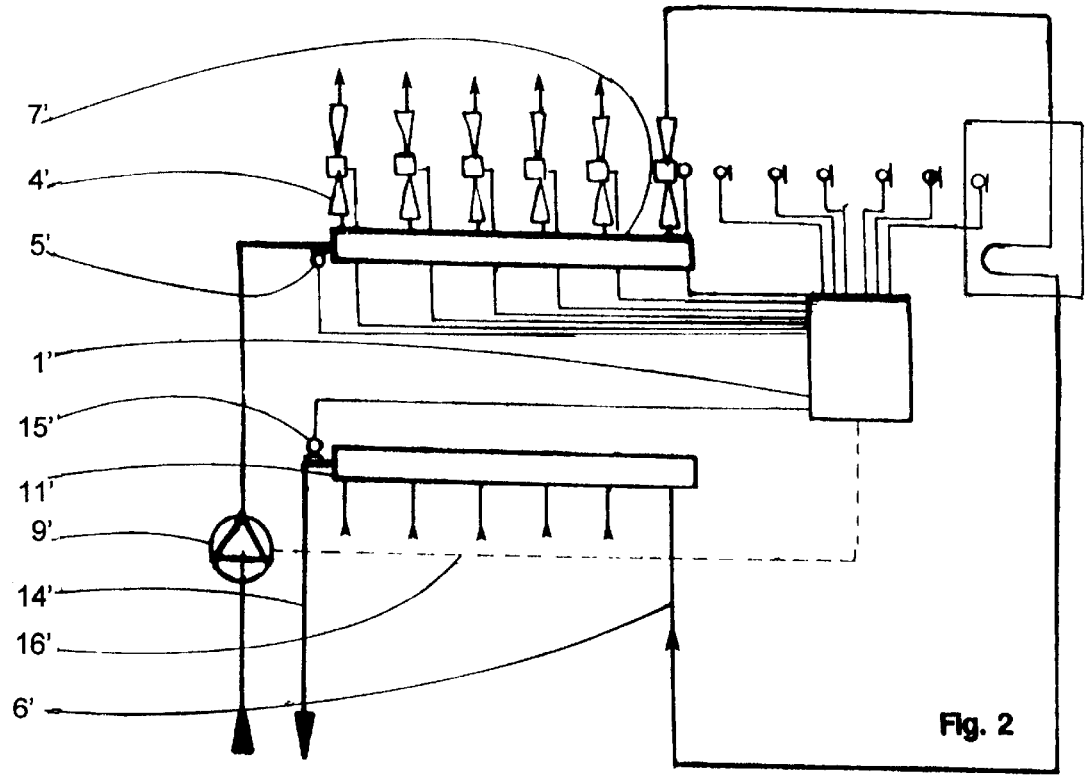
FIG. 2 shows a simplified version with only one temperature sensor in the return line.

FIG. 2 shows a simplified version of the invention. Instead of the temperature sensors 5 in FIG. 1 for each loop in the return-line manifold 11', a single heat sensor 15' measures the temperature at the junction of the return-line manifold 11' and the return-line 14' of the primary loop. From time to time the control unit 1' closes all throttle-valves 4', except one, for a short time and measures the temperature difference of the circulated water between the temperature sensor 5' on the feed-line side manifold 7' and the temperature sensor 15' in the return-side manifold 11' . By evaluating the relevant temperature difference the control unit 1' throttles the relevant valve 4' accordingly. In case the performance of the circulator pump 9 which is connected by lead 16 to the control unit 1' is adjustable, the control unit 1' keeps the pump [pressure] mm almost constant also when some of the loops will be dosed. In case the temperature-difference between the feed-line 6 in FIG. 1 and the return-line 6' decreases, the [performance] am of the circulator pump 9' will be decreased. If said [the] temperature difference is too high, the [performance] mm of the pump will be increased.

I claim:

1. Process and means to control the temperature of rooms of different zones with floor- or ceiling-heaters in a hydronic system with a circulator pump in a primary loop, a control unit and a number of secondary hot water loops controlled by said control unit, and a valve for each secondary loop, characterized in that the control unit (1) fully automatically ensures that all secondary loops have the same difference in the water temperature between their feed lines (6) and their relevant return lines.

2. Process and means to control the temperature of rooms of different zones with floor- or ceiling-heaters according to claim 1, characterized in that the control unit (1, 1') compares the temperature difference of the secondary loops (6, 6') for each zone to determine the loop with the highest temperature difference and then keeps the throttle valve (4, 4') of this loop fully open during operation.

3. Process and means to control the temperature of rooms of different zones with floor- or ceiling-heaters with a circulator pump (9, 9') with variable rpm according to claim 6, characterized in that the control unit (1, 1') reduces the rpm of the controllable circuit (9, 9') as soon as the throttling of a throttle valve (4, 4') would result in turbulence noise.

4. Process and means to control the temperature of rooms of different zones with floor- or ceiling-heaters according to claim 1, comprising a primary loop (19) in which hot water is conveyed by pump (9), a first manifold (7) with infinitely adjustable throttle valves (4) in the feed lines of the secondary loops, the manifold (7) being equipped with a temperature sensor (5) near to the connection between the manifold (7) and the feed-line (19) of the primary loop, the temperature sensor (5) being electrically connected to the control unit (1) and wherein a second manifold (11), connected to the return fine (14) of the primary loop, has temperature sensors (15) measuring the water temperature in each of the return lines of the secondary loops and being electrically connected by lead (12) to the control unit (1), which adjusts the water temperature of each secondary loop in such a way that the difference in the water temperature between the begin of the feed line of the secondary loops and the relevant return lines will be the same.

5. Process and means to control the temperature of rooms of different zones with floor- or ceiling-heaters according to claim 4, wherein in addition each valve (4) has a temperature sensor (2) being electrically connect by leads (3) to the control unit (1).

6. Process and means to control the temperature of rooms of different zones with floor- or ceiling-heaters according to claim 1, wherein all secondary loops are connected to the feed-line (19) of the primary loop by mechanically infinitely adjustable throttle valves (4') and whereby the temperature of the return-line of each secondary loop (6') is measured by a single temperature sensor (15'), which is in thermal contact with the return-side manifold (11').

7. Process to control the temperature of rooms of different zones with floor- or ceiling-heaters according to claim 1, wherein from time to time the control unit (1) fully opens the valve (4, 4') of the longest secondary loop and measures the temperature difference between the water temperature in the feed-line and in the return line and thereafter throttles the valves (4, 4') of each of the remaining secondary loops so far that finally all secondary loops reach the same temperature as the longest secondary loop.

\* \* \* \* \*